United States Patent [19]
Burts, Jr.

[11] Patent Number: 6,098,712
[45] Date of Patent: *Aug. 8, 2000

[54] METHOD OF PLUGGING A WELL

[75] Inventor: Boyce D. Burts, Jr., Maurice, La.

[73] Assignee: Bottom Line Industries, Inc., LaFayette, La.

[ * ] Notice: This patent is subject to a terminal disclaimer.

[21] Appl. No.: 08/962,211

[22] Filed: Oct. 31, 1997

[51] Int. Cl.$^7$ .................................................. E21B 33/138
[52] U.S. Cl. .......................... 166/295; 166/300; 507/903; 523/130
[58] Field of Search .................................. 166/295, 300; 507/204, 903, 904; 523/130

[56] References Cited

U.S. PATENT DOCUMENTS

| | | |
|---|---|---|
| 2,610,149 | 9/1952 | VanDyke . |
| 2,708,973 | 5/1955 | Twining . |
| 2,779,417 | 1/1957 | Clark et al. . |
| 3,208,524 | 9/1965 | Horner et al. ............................ 166/294 |
| 3,374,834 | 3/1968 | Ramos et al. . |
| 3,408,296 | 10/1968 | Kuhn et al. ........................ 166/283 X |
| 3,462,958 | 8/1969 | Patin et al. . |
| 3,701,384 | 10/1972 | Routson et al. ........................... 166/292 |
| 3,766,984 | 10/1973 | Nimerick .............................. 166/295 X |
| 3,845,822 | 11/1974 | Clampitt et al. ......................... 166/281 |
| 3,981,363 | 9/1976 | Gall ....................................... 166/270 |
| 4,018,286 | 4/1977 | Gall et al. ................................ 166/295 |
| 4,039,029 | 8/1977 | Gall ........................................ 166/294 |
| 4,183,406 | 1/1980 | Lundberg et al. ....................... 166/295 |
| 4,247,403 | 1/1981 | Foley et al. . |
| 4,391,925 | 7/1983 | Mintz et al. ............................. 523/130 |
| 4,474,665 | 10/1984 | Green . |
| 4,579,668 | 4/1986 | Messenger . |
| 4,683,949 | 8/1987 | Sydansk et al. ......................... 166/270 |
| 4,722,397 | 2/1988 | Sydansk et al. ......................... 166/295 |
| 4,723,605 | 2/1988 | Sydansk .................................. 166/295 |
| 4,730,674 | 3/1988 | Burdge et al. ........................... 166/295 |
| 4,730,675 | 3/1988 | Wygant et al. .......................... 166/295 |
| 4,744,418 | 5/1988 | Sydansk .................................. 166/295 |
| 4,744,419 | 5/1988 | Sydansk et al. ......................... 166/270 |
| 4,770,245 | 9/1988 | Sydansk .................................. 166/295 |
| 4,779,680 | 10/1988 | Sydansk et al. ......................... 166/300 |
| 4,844,168 | 7/1989 | Sydansk .................................. 166/270 |
| 4,947,935 | 8/1990 | Sydansk .................................. 166/295 |
| 4,957,166 | 9/1990 | Sydansk .................................. 166/295 |
| 4,989,673 | 2/1991 | Sydansk .................................. 166/250 |
| 4,995,461 | 2/1991 | Sydansk .................................. 166/295 |
| 5,004,553 | 4/1991 | House et al. . |
| 5,065,820 | 11/1991 | Bloys et al. ............................. 166/291 |
| 5,071,575 | 12/1991 | House et al. ............................ 507/104 |
| 5,076,944 | 12/1991 | Cowan et al. ........................... 507/104 |
| 5,118,664 | 6/1992 | Burts, Jr. ................................. 507/104 |
| 5,229,018 | 7/1993 | Forrest .................................... 507/204 |
| 5,246,602 | 9/1993 | Forrest .................................... 166/283 |
| 5,377,760 | 1/1995 | Merrill .................................... 166/295 |
| 5,415,229 | 5/1995 | Sydansk .................................. 166/295 |
| 5,421,411 | 6/1995 | Sydansk .................................. 166/295 |
| 5,478,802 | 12/1995 | Moradi-Araghi ....................... 507/203 |
| 5,501,275 | 3/1996 | Card et al. .............................. 166/280 |
| 5,599,776 | 2/1997 | Burts, Jr. ................................. 507/104 |

*Primary Examiner*—George Suchfield
*Attorney, Agent, or Firm*—J. M. (Mark) Gilbreth; Mary A. Gilbreth; Gilbreth & Associates P.C.

[57] ABSTRACT

For well plug treatment to plug an abandoned well, a well plug additive including a dry mixture of water soluble crosslinkable polymer, a crosslinking agent, and a reinforcing material of fibers and/or comminuted plant materials. The method of forming a well plug fluid includes contacting the additive with water or an aqueous solution, with a method of plugging the well further including the step of injecting the fluid into the wellbore.

20 Claims, No Drawings

METHOD OF PLUGGING A WELL

BACKGROUND OF THE INVENTION

1. Field of the Invention

The present invention relates to well plug additives, to well plug treatment fluids made therefrom, to methods of plugging a well. In another aspect, the present invention relates to well plug additives comprising polymer and fibers or comminuted plant materials, to well plug treatment fluids made therefrom, to methods of plugging a well using such fluids.

2. Description of the Related Art

Wells employed in the production of oil and gas are abandoned inter alia because they reach the end of their useful life or they become damaged beyond repair. State and federal regulations require that abandoned wells be plugged to protect safety and environmental interests. The well is commonly plugged by pumping Portland cement into the wellbore and curing the cement in situ.

Formulation of Portland cement in the field is largely a product of trial and error by field personnel to meet irregularities in the cementing composition and the downhole environment. Cement quality control is difficult to achieve under such conditions. As a result, Portland cement cured in situ can exhibit cracking, shrinking, or poor adhesion to wellbore tubulars. An imperfect Portland cement plug can enable undesirable fluid flow through the wellbore via leaks along or through the cement.

U.S. Pat. No. 4,730,675, issued Mar. 15, 1988 to Wygant and Sydansk note that a process was then needed which employed a plugging material having a broad range of highly controllable and predictable set-up times providing ease of operation and design at a relatively low cost. Wygant and Sydansk further noted that a process was then needed employing a substitute material for Portland cement in conventional plugging processes which forms a more effective plug and seals the wellbore indefinitely.

U.S. Pat. No. 4,730,675 proposes the use of a water soluble carboxylate crosslinking polymer along with a chromic carboxylate complex crosslinking agent in the plugging of an abandoned well, and at column 1, lines 61–63, specifically teaches away from the use of solids in the plugging fluid injected into the wellbore.

Thus, while U.S. Pat. No. 5,377,760, issued Jan. 3, 1995 to Merrill discloses addition of fibers to an aqueous solution of partially hydrolyzed polyacrylamide polymer, with subsequent injection into the subterranean to improve conformance, the performance requirements of conformance improvement treatment polymers are so different from those of polymers for plugging an abandoned well, that such would not necessarily work for well plug treatment. Furthermore, Wygant and Sydansk teach away from injection a solid containing polymer into the wellbore to plug an abandoned well.

Additionally, Merrill's conformance treatment method of mixing the fibers with the polymer solution followed by injection, requires a multiplicity of storage and mixing tanks, and a metering system which must be operated during the operation of the well. Specifically, a first tank will store a water and polymer solution, a second tank will store a water and cross-linking solution, and a third tank will be used to mix fibers with polymer solution from the first tank to create a polymer/fiber slurry. This polymer/fiber slurry is then metered from the third tank and combined with cross-linking solution metered from the second tank to the well bore.

Thus, in spite of the advancements in the prior art, there still is a need for further innovation in the well plug additives.

There is need for further innovation for well plug additives utilizing a water soluble polymer.

There is another need for a well plug additive which would allow for simplification of the mixing equipment.

These and other needs in the art will become apparent to those of skill in the art upon review of this specification, including its drawings and claims.

SUMMARY OF THE INVENTION

It is an object of the present invention to provide for further innovation in well plug additives.

It is an another object of the present invention to provide for further innovation for well plug additives utilizing a water soluble polymer.

It is even another object of the present invention to provide for a well plug additive which would allow for simplification of the mixing equipment.

These and other objects of the present invention will become apparent to those of skill in the art upon review of this specification, including its drawings and claims.

According to one embodiment of the present invention there is provided a well plug additive comprising a dry mixture of water soluble crosslinkable polymer, a crosslinking agent, and a reinforcing material selected from among fibers and comminuted plant materials. In preferred embodiments, the polymer is an a carboxylate-containing polymer and the crosslinking agent is a chromic carboxylate complex. In other preferred embodiments, the reinforcing material may comprise hydrophobic fibers selected from among nylon, rayon, and hydrocarbon fibers, and/or hydrophilic fibers selected from among glass, cellulose, carbon, silicon, graphite, calcined petroleum coke, and cotton fibers. The comminuted plant material is selected from the group of comminuted plant materials of nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof.

According to another embodiment of the present invention, there is provided a method of forming a well plug fluid. The method generally includes taking the above well plug additive and contacting it with water or other aqueous solution.

According to even another embodiment of the present invention, there is provided a method of plugging a well. The method generally includes contacting the above described well plug additive with water or an aqueous solution to form a well plug fluid. The method then includes injecting the well plug fluid into the wellbore.

These and other embodiments of the present invention will become apparent to those of skill in the art upon review of this specification and claims.

DETAILED DESCRIPTION OF THE INVENTION

The well plug additive of the present invention includes polymer, cross-linking agent and either fibers or comminuted particles of plant materials. In a preferred embodiment of the present invention, the well plug additive is a dry mixture of polymer, cross-linking agent and either fibers or comminuted particles of plant materials.

Any suitable relative amounts of the polymer, cross-linking agent and either fibers or comminuted particles of plant materials may be utilized in the present invention provided that the desired well plug results are achieved. Generally, the fibers or comminuted particles will comprise in the range of about 1 to about 99 weight percent, preferably in the range of about 25 to about 90 weight percent, more preferably in the range of about 50 to about 80 weight percent, and even more preferably in the range of about 70 to about 75 weight percent, all based on the total with of the polymer, fibers and particles. A suitable amount of crosslinking agent is provided to reach the desired amount of crosslinking. Suitable amounts of dispersants, retarders, accelerants, and other additives may be provided as necessary or desired.

The polymer utilized in the practice of the present invention is preferably water soluble and must be capable of being pumped as a liquid and subsequently crosslinked in place to form a substantially non-flowing crosslinked polymer which has sufficient strength to withstand the pressures exerted on it. Moreover, it must have a network structure capable of incorporating reinforcing fibers.

The present invention provides an additive, fluid and process for plugging an abandoned well. The well is plugged by means of a plugging material comprising a tailor-made crosslinked polymer gel, which preferably contains a high molecular weight, water-soluble carboxylate-containing polymer a chromic carboxylate complex crosslinking agent, and either fibers or comminuted particles of plant materials.

"Gel" as used herein is directed to a continuous three-dimensional crosslinked polymeric network having an ultra high molecular weight. The gel contains a liquid medium such as water which is confined within the solid polymeric network. The fusion of a liquid and a solid component into a single-phase system provides the gel with a unique phase behavior. Gels employed by the present invention have sufficient structure so as not to substantially propagate from the confines of a wellbore into a less permeable region of the formation adjoining the wellbore when injected into the wellbore.

"Plugging" is the substantial prevention of fluid flow from a subterranean formation and through the wellbore.

"Partially gelled" solutions are also referred to herein. A partially gelled solution is at least somewhat more viscous than an uncrosslinked polymer solution such that it is incapable of entering a less permeable region where no treatment is desired, but sufficiently fluid such that it is capable of displacement into a desired treatment zone. The crosslinking agent of the partially gelled solution has reacted incompletely with the polymer with the result that neither all of the polymer nor all of the crosslinking agent in the gelation solution is totally consumed by the crosslinking reaction. The partially gelled solution is capable of further crosslinking to completion resulting in the desired gel without the addition of more crosslinking agent.

"Crosslinked to completion" means that the gel composition is incapable of further crosslinking because one or both of the required reactants in the initial solution are consumed. Further crosslinking is only possible if either polymer, crosslinking agent, or both are added to the gel composition.

The gel is prepared by forming a uniform gelation solution above ground containing the polymer, crosslinking agent and either fibers or comminuted particles of plant materials, pumping the solution into a wellbore penetrating a hydrocarbon-bearing formation and curing the solution to a gel in the wellbore.

In a preferred embodiment, a dry mixture of the polymer, crosslinking agent and either fibers or comminuted particles of plant materials, are contacted with water or an aqueous solution.

The gelation solution may be advantageously designed to be at least partially gelled by the time it reaches the wellbore to inhibit or prevent its propagation into a less permeable subterranean material, such as a formation matrix, which may adjoin the wellbore face where no plugging is required. The gelation solution sets up in the wellbore without requiring the further injection of any additional components. The gel is a continuous single-phase material which substantially plugs the well.

It is generally believed that the plugging material of the present invention will perform adequately as compared to Portland cement at a comparatively lower cost. Biocides or other special chemicals can be readily incorporated into the gelation solution if desired.

The mature gel resulting from the solution forms a tenacious chemical bond with the rock of the wellbore face and the wellbore tubulars to provide a tight seal. The gel is substantially impermeable to subterranean fluids and permanent. It is resistant to in situ degradation and corrosion. The gel does not shrink or crack, yet is sufficiently deformable to fill microvoids in the treatment region. The gel is sufficiently strong to resist displacement from the plugged well by natural forces, but is sufficiently elastic to accommodate minor shifts in the earth's surface without cracking or faulting.

If it is desired to return an abandoned well to operation after plugging, the present process can be reversed by dissolving the gel with a suitable solvent and pumping the dissolved gel to the surface. Alternatively, the gel can be drilled out or mechanically removed with relative ease.

The gel employed in the present invention possesses a broad range of highly controllable and predictable set-up times and strengths. The process is applicable to a broad range of temperatures, salinities, rock formations, and environments. The practitioner can customize or tailor a gel for specific operational constraints, downhole characteristics and subsequent performance demands. One can predetermine the gelation rate and resultant gel strength and stability which are required of a gel to plug the wellbore. Thereafter, a gel having the required predetermined properties is produced under controlled conditions at the surface by utilizing observed correlations between specific controllable gelation parameters and resultant gel properties.

While any suitable water soluble polymer may be utilized, the preferred polymer utilized in the practice of the present invention is a carboxylate-containing polymer. This preferred carboxylate-containing polymer may be any crosslinkable, high molecular weight, water-soluble, synthetic polymer or biopolymer containing one or more carboxylate species.

For an example of a suitable polymer and crosslinking agent, and of the method of making and using for plugging an abandoned well, please see U.S. Pat. No. 4,730,675, herein incorporated by reference.

The average molecular weight of the carboxylate-containing polymer utilized in the practice of the present invention is in the range of about 10,000 to about 50,000,000, preferably in the range of about 100,000 to about 20,000,000, and most preferably in the range of about 200,000 to about 15,000,000.

Biopolymers useful in the present invention include polysaccharides and modified polysaccharides. Non-limiting examples of biopolymers are xanthan gum, guar gum, carboxymethylcellulose, o-carboxychitosans, hydroxyethylcellulose, hydroxypropylcellulose, and modified starches. Non-limiting examples of useful synthetic polymers include acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

Any crosslinking agent suitable for use with the selected polymer may be utilized in the practice of the present invention. Preferably, the crosslinking agent utilized in the present invention is a chromic carboxylate complex.

The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The chromic carboxylate complex useful in the practice of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Non-limiting representative formulae of such complexes include:

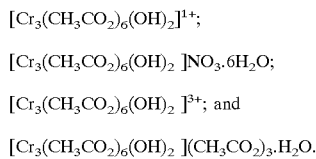

$[Cr_3(CH_3CO_2)_6(OH)_2]^{1+}$;

$[Cr_3(CH_3CO_2)_6(OH)_2]NO_3 \cdot 6H_2O$;

$[Cr_3(CH_3CO_2)_6(OH)_2]^{3+}$; and $[Cr_3(CH_3CO_2)_6(OH)_2](CH_3CO_2)_3 \cdot H_2O$.

"Trivalent chromium" and "chromic ion" are equivalent terms encompassed by the term "chromium III" species as used herein.

The carboxylate species are advantageously derived from water-soluble salts of carboxylic acids, especially low molecular weight mono-basic acids. Carboxylate species derived from salts of formic, acetic, propionic, and lactic acid, substituted derivatives thereof and mixtures thereof are preferred. The preferred carboxylate species include the following water-soluble species: formate, acetate, propionate, lactate, substituted derivatives thereof, and mixtures thereof. Acetate is the most preferred carboxylate species. Examples of optional inorganic ions include sodium, sulfate, nitrate and chloride ions.

A host of complexes of the type described above and their method of preparation are well known in the leather tanning art. These complexes are described in Shuttleworth and Russel, Journal of the Society of Leather Trades' Chemists, "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdman, Das Leder, "Condensation of Mononuclear Chromium (III) Salts to Polynuclear Compounds," Eduard Roether Verlag, Darmstadt Germany, 1963, v. 14, p. 249; and incorporated herein by reference. Udy, Marvin J., Chromium. Volume 1: Chemistry of Chromium and its Compounds. Reinhold Publishing Corp., N.Y., 1956, pp. 229–233; and Cotton and Wilkinson, Advanced Inorganic Chemistry 3rd Ed., John Wiley and Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

Salts of chromium and an inorganic monovalent anion, e.g., CrCl3, may also be combined with the crosslinking agent complex to accelerate gelation of the polymer solution, as described in U.S. Pat. No. 4,723,605 to Sydansk, which is incorporated herein by reference.

The molar ratio of carboxylate species to chromium III in the chromic carboxylate complexes used in the process of the present invention is typically in the range of 1:1 to 3.9:1. The preferred ratio is range of 2:1 to 3.9:1 and the most preferred ratio is 2.5:1 to 3.5:1.

The additive of the present invention may comprise fibers or comminuted particles of plant materials, and preferably comprises comminuted particles of one or more plant materials.

Fibers suitable for use in the present invention are selected from among hydrophilic and hydrophobic fibers. Incorporation of hydrophobic fibers will require use of a suitable wetting agent. Preferably, the fibers utilized in the present invention comprise hydrophilic fibers, most preferably both hydrophilic and hydrophobic fibers.

With respect to any particular fiber employed in the practice of the present invention, it is believed that the longer the fiber, the more difficult it is to be mixed uniformly in solution. It is believed that fibers as long as 12,500 microns may tend to aggregate and form clumps. The shorter the fiber, it is believed the easier it is to mix in solution. On the other hand, the shorter the fiber, the greater the quantity necessary to provide the desired level of strength in a reinforced mature gel. In general, the fibers utilized in the present invention will have a length in the range of 100 microns to 3200 microns, preferable 100 microns to 1000 microns.

Non-limiting examples of suitable hydrophobic fibers include nylon, rayon, hydrocarbon fibers and mixtures thereof.

Non-limiting examples of suitable hydrophilic fibers include glass, cellulose, carbon, silicon, graphite, calcined petroleum coke, cotton fibers, and mixtures thereof.

Non-limiting examples of comminuted particles of plant materials suitable for use in the present invention include any derived from: nut and seed shells or hulls such as those of peanut, almond, brazil, cocoa bean, coconut, cotton, flax, grass, linseed, maize, millet, oat, peach, peanut, rice, rye, soybean, sunflower, walnut, wheat; various portions of rice including the rice tips, rice straw and rice bran; crude pectate pulp; peat moss fibers; flax; cotton; cotton linters; wool; sugar cane; paper; bagasse; bamboo; corn stalks; various tree portions including sawdust, wood or bark; straw; cork; dehydrated vegetable matter (suitably dehydrated carbonhydrates such as citrus pulp, oatmeal, tapioca, rice grains, potatoes, carrots, beets, and various grain sorghams); whole ground corn cobs; or various plant portions the corn cob light density pith core, the corn cob ground woody ring portion, the corn cob coarse or fine chaff portion, cotton seed stems, flax stems, wheat stems, sunflower seed stems, soybean stems, maize stems, rye grass stems, millet stems, and various mixtures of these materials.

Optionally, dispersant for comminuted plant material will be utilized the in the range of about 1 to about 20 pounds, preferably in the range of about 5 to about 10 pounds, and more preferably in the range of about 7 to about 8 pounds of dispersant may be utilized per pound of comminuted plant material. A non-limiting example of a suitable dispersant is NaCl.

Preferred comminuted materials useful in the practice of the present invention include those derived from peanuts, wood, paper any portion of rice seed or plant, and any portion of corn cobs.

These various materials can be comminuted to very fine particle sizes by drying the products and using hammer mills, cutter heads, air control mills or other comminution methods as is well known to those of skill in the comminution art. Air classification equipment or other means can be used for separation of desired ranges of particle sizes using techniques well-known in the comminution art.

Any suitable size of comminuted material may be utilized in the present invention, along as such size produces results which are desired. In most instances, the size range of the comminuted materials utilized herein will range from below about 8 mesh ("mesh" as used herein refers to standard U.S. mesh), preferably from about −65 mesh to about −100 mesh, and more preferably from about −65 mesh to about −85 mesh. Specifically preferred particle sizes for some materials are provided below.

Preferred mixtures of comminuted materials useful in the practice of the present invention include a rice fraction and peanut hulls; a rice fraction and wood fiber and/or almond hulls; a rice fraction and a corn cob fraction, preferably a chaff portion; and a corn cob fraction, preferably a pith or chaff portion, a rice fraction, and at least one of wood fiber, nut shells, paper and shredded cellophane.

Rice is commercially available in the form of rice hulls, rice tips, rice straw and rice bran, as these various parts of the rice plant are separated commercially and are widely available from rice mills. Preferably, the size range of the rice fraction utilized herein will range from below about 8 mesh ("mesh" as used herein refers to standard U.S. mesh), preferably from about −65 mesh to about −100 mesh, and more preferably from about −65 mesh to about −85 mesh.

After the corn kernels are removed, corn cobs consist of four principle parts that are arranged concentrically. The central portion is a very light density pith core, that is surrounded by a woody ring, that in turn is surrounded by a coarse chaff portion, that in turn is covered by a fine chaff portion. The coarse and fine chaff portions form the sockets for anchoring the corn kernels to the corncob. The normal methods of grinding corncobs produce a mixture of all four parts enumerated above. It is possible, however, to separate the woody ring material from the remainder of the cob. The chaff portion of the corncob remaining after removal of the woody ring material is known as "bees wings". In the present invention, any of the pith or chaff portions("BPC") are the preferred portions of the corn cob, with the chaff portions being more preferred. A range of particle sizes of pith and chaff can be obtained from comminution, but the size range smaller than about 8 mesh is suitable for this invention. Preferably, a particle size distribution ranging from smaller than 8 mesh to smaller than 100 mesh is utilized.

Preferred woods for use as comminuted materials in the present invention include any type of hard wood fiber, including cedar fiber, oak fiber, pecan fiber and elm fiber. Preferably the wood fiber comprises cedar fibers.

Preferred nut shells for use in the present invention include pecan, walnut, and almond. Preferably, the nut shells comprise at least one of pecan or walnut shells.

Preferred particle sizes for the wood fibers, nut shells, paper and cellophane will generally range from about +10 mesh to −100 mesh. An illustration of a non-limiting particle size distribution for these materials would include particles of +10 mesh, +20 mesh, +30 mesh, +50 mesh, +60 mesh, +100 mesh, and −100 mesh.

For one of the preferred comminuted plant mixtures comprising a corn cob fraction, a rice fraction, and at least one of wood fiber, nut shells, paper and shredded cellophane, the mixture will generally comprise in the range of about 5 to about 95 weight percent rice, in the range of about 5 to about 95 weight percent corncob pith or chaff, with the total of ground wood fiber, ground nut shells, ground paper and shredded cellophane comprising in the range of about 5 to about 95 weight percent (weight percent based on the total weight of plant material in the mixture. Preferred ranges are about 20 to about 75 weight percent rice, about 5 to about 35 weight percent corncob pith or chaff, with the total of ground wood fiber, ground nut shells, ground paper and shredded cellophane comprising in the range of about 20 to about 75 weight percent. More preferred ranges are about 30 to about 50 weight percent rice, about 10 to about 30 weight percent corncob pith and chaff, with the total of ground wood fiber, ground nut shells, ground paper and shredded cellophane comprising in the range of about 25 to about 50 weight percent.

As these comminuted materials are to be added to a water base well plug fluid, a small amount of oil may optionally added to the mixture. This optional oil is preferably added while the plant materials are being mixed together. This mixing may take place in a ribbon blender, where the oil in the required amount is applied by a spray bar. The oil wets the particles and adds to their lubricity while at the same time helping to control dust produced by the mixing operation. A variety of oils may be utilized in the practice of the present invention in concentrations generally ranging from about 1 percent to about 5 percent by weight based on the total weight of the mixture of comminuted materials, more preferably ranging from about 1 percent to about 2 percent. A non-limiting example of a commercially available oil suitable for use in the present invention includes ISOPAR V, available from Exxon Corporation.

The various components of the present invention may be mixed in any suitable order utilizing mixing techniques as known to those in the art, including dry mixing of the various components prior to addition to water, or alternatively, either or both of the polymer and cross-linking agent may be utilized as a solution. Most preferably, the various components are mixed in dry form, and then contacted with water or aqueous solution to form a well plug fluid. This well plug fluid is then injected into the well as is known in the art.

Utilizing the additive of the present invention, one can produce gels across a very broad range of gelation rates and gel properties as a function of the gelation conditions. Thus, to effect an optimum plugging job according to the present process, the practitioner predetermines the gelation rate and properties of the resultant gel which meet the demands of the given wellbore and thereafter produces the gel having these predetermined characteristics. The demands of the wellbore include the in situ gelation conditions such as temperature, connate water properties, size of the treatment volume, the pressure drop and permeability of the adjoining matrix as well as the post treatment conditions such as shut-in pressures. Analytical methods known to one skilled in the art are used to determine these demands which provide criteria to predetermine the gelation rate and resultant gel properties in the manner described above and continuing hereafter.

The gelation rate is advantageously sufficiently slow to enable preparation of the gelation solution at the surface and injection of the solution as a uniform slug into the wellbore. Too rapid a gelation rate produces excessive gelation of the solution at the surface which results in a solution that may be difficult, if not impossible, to inject into the wellbore to be plugged due to its rheological properties. At the same time, the gelation rate must be sufficiently rapid to enable completion of the reaction within a reasonable period of time to satisfy regulatory requirements.

The solution may be substantially ungelled before reaching the wellbore. However, at least partial gelation of the solution may be advantageous before the solution reaches the wellbore face to prevent the solution from penetrating the permeable rock bounding the wellbore. Substantial penetration of such material by the solution results in unnecessary and wasteful consumption of the solution. The solution advantageously gels to completion in the wellbore. The values of the independent variables in the process are carefully selected to achieve a gelation rate meeting these criteria.

The amount of solution injected into the wellbore is a function of the volume of the wellbore to be plugged and its performance demands. One skilled in the art can determine the required amount of a gel to plug a given wellbore.

The injection rate is a function of the gelation rate and operational constraints of injection pressure and pumping limits. The required injection rate is fixed such that all of the solution can be practically injected into the volume before it becomes unpumpable. The gelation time of the gel ranges from near instantaneous up to 48 hours or longer. Longer gelation times are limited by practical considerations.

Gels having a predetermined gelation rate and resultant gel properties to meet the demands of a given well are produced by adjusting and setting the surface gelation conditions as they correlate to the gelation rate and gel properties. Accordingly, the gels are produced in a manner which renders them insensitive to most extreme formation conditions. The gels can be stable at formation temperatures as high as 130° C. or more and at any formation pH contemplated. The gels are relatively insensitive to the stratigraphy of the rock, metal tubulars and other materials and chemicals employed in cementing operations. The gels can be employed in carbonate and sandstone strata and unconsolidated or consolidated strata having varying mineralogy. The gels are substantially insoluble in the formation fluids. Once the gels are in place, they are substantially permanent and resistant to in situ degradation.

If it is desired to reactivate a plugged well, the gels may be reversible on contact with sodium hypochlorite, hydrogen peroxide or any other suitable peroxo compound. Alternatively, the gels can be drilled or bailed out of the wellbore.

The process is applicable to most plugging applications where Portland cement is presently used, simply by substituting the gel for the Portland cement and selecting the gelation conditions in the manner described herein. Although the invention has been described in the context of oil field injection and production wells, the plugging process is applicable to virtually any well one desires to plug, including abandoned waste injection wells, water wells, etc.

The strength of the gel can vary from an elastic jelly-like material to a rigid rubber-like material. The stronger materials are generally preferred where extreme shut-in pressures are encountered which could cause a weak plug to fail. PA is often preferred for such formulations because it has a slower gelation rate than PHPA which enables one to inject it into the wellbore before it sets up.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. A method for plugging a well in fluid communication with a subterranean formation below an earthen surface comprising:
   (a) providing a well plug additive comprising a dry mixture of water soluble crosslinkable polymer, a crosslinking agent, and a reinforcing material selected from among fibers and comminuted plant materials;
   (b) contacting the well plug additive with water or an aqueous solution to form a well plug fluid;
   (c) injecting the well plug fluid into the wellbore of said well; and
   (d) crosslinking said well plug fluid in said wellbore to form a non-flowing well plug fluid which substanitally plugs said well.

2. The method of claim 1 wherein the polymer is an a carboxylate-containing polymer and the crosslinking agent is a chromic carboxylate complex.

3. The method of claim 2 wherein the reinforcing material comprises hydrophilic and hydrophobic fibers.

4. The method of claim 3 wherein the hydrophobic fibers comprise at least one selected from the group of hydrophobic fibers consisting of nylon, rayon, and hydrocarbon fibers, and wherein the hydrophilic fibers comprise at least one selected from the group of hydrophilic fibers consisting of glass, cellulose, carbon, silicon, graphite, calcined petroleum coke, and cotton fibers.

5. The method of claim 2 wherein the reinforcing material comprises comminuted plant material.

6. The method of claim 5 wherein the reinforcing material comprises at least one comminuted material selected from the group of comminuted plant materials consisting of nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof.

7. The method of claim 2 wherein the polymer is a partially hydrolyzed polyacrylamide.

8. The method of claim 7 wherein the reinforcing material is a comminuted material selected from among comminuted materials derived from peanuts, wood, paper any portion of rice seed or plant, any portion of corn cobs, and mixtures thereof.

9. The method of claim 8 wherein the additive further includes cellophane, and wherein the reinforcing material is a comminuted material selected from among mixtures of comminuted rice fraction and peanut hulls; mixtures of comminuted rice fraction, and wood fiber or almond hulls; mixtures of comminuted rice fraction and corn cob fraction; and mixtures of comminuted rice fraction and corn cob fraction and at least one of wood fiber, nut shells, and paper.

10. The method of claim 9 wherein the reinforcing material comprises comminuted mixture of rice fraction, corn cob pith and chaff, cedar fiber, nut shells, and paper.

11. A method for plugging a well in fluid communication with a subterranean formation below an earthen surface comprising:

(a) providing a well plug fluid comprising an aqueous solution of water soluble crosslinkable polymer, a crosslinking agent, and a reinforcing material selected from among fibers and comminuted plant materials;

(b) injecting the well plug fluid into the well bore of said well; and (c) crosslinking said well plug fluid in said wellbore to form a non-flowing well plug fluid which substanitally plugs said well.

12. The method of claim 11 wherein the polymer is an a carboxylate-containing polymer and the crosslinking agent is a chromic carboxylate complex.

13. The method of claim 12 wherein the reinforcing material comprises hydrophilic and hydrophobic fibers.

14. The method of claim 13 where in the hydrophobic fibers comprise at least one selected from the group of hydrophobic fibers consisting of nylon, rayon, and hydrocarbon fibers, and wherein the hydrophilic fibers comprise at least one selected from the group of hydrophilic fibers consisting of glass, cellulose, carbon, silicon, graphite, calcined petroleum coke, and cotton fibers.

15. The method of claim 12 wherein the reinforcing material comprises comminuted plant material.

16. The method of claim 15 wherein the reinforcing material comprises at least one comminuted material selected from the group of comminuted plant materials consisting of nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof.

17. The method of claim 12 wherein the polymer is a partially hydrolyzed polyacrylamide.

18. The method of claim 17 wherein the reinforcing material is a comminuted material selected from among comminuted materials derived from peanuts, wood, paper any portion of rice seed or plant, any portion of corn cobs, and mixtures thereof.

19. The method of claim 18 wherein the additive further includes cellophane, and wherein the reinforcing material is a comminuted material selected from among mixtures of comminuted rice fraction and peanut hulls; mixtures of comminuted rice fraction, and wood fiber or almond hulls; mixtures of comminuted rice fraction and corn cob fraction; and mixtures of comminuted rice fraction and corn cob fraction and at least one of wood fiber, nut shells, and paper.

20. The method of claim 19 wherein the reinforcing material comprises comminuted mixture of rice fraction, corn cob pith and chaff, cedar fiber, nut shells, and paper.

* * * * *